(12) United States Patent
Passmore

(10) Patent No.: US 10,633,952 B2
(45) Date of Patent: Apr. 28, 2020

(54) 3D PRINTED SUBSURFACE TOOL HAVING A METAL DIAPHRAGM

(71) Applicant: Halliburton Energy Services, Inc., Houston, TX (US)

(72) Inventor: Kevin Robin Passmore, McKinney, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/072,618

(22) PCT Filed: Mar. 14, 2016

(86) PCT No.: PCT/US2016/022270
§ 371 (c)(1),
(2) Date: Jul. 25, 2018

(87) PCT Pub. No.: WO2017/160266
PCT Pub. Date: Sep. 21, 2017

(65) Prior Publication Data
US 2019/0032451 A1    Jan. 31, 2019

(51) Int. Cl.
| | |
|---|---|
| E21B 34/14 | (2006.01) |
| B22F 3/105 | (2006.01) |
| B33Y 80/00 | (2015.01) |
| B22F 5/10 | (2006.01) |
| B22F 5/00 | (2006.01) |

(Continued)

(52) U.S. Cl.
CPC ............ *E21B 34/14* (2013.01); *B22F 3/1055* (2013.01); *B22F 5/00* (2013.01); *B22F 5/106* (2013.01); *B33Y 80/00* (2014.12); *B22F 7/08* (2013.01); *B22F 2003/1056* (2013.01);

(Continued)

(58) Field of Classification Search
CPC .. E21B 34/14; E21B 2034/007; B22F 3/1055; B22F 5/00; B22F 5/106; B33Y 80/00
See application file for complete search history.

(56) References Cited

U.S. PATENT DOCUMENTS

| | | | | |
|---|---|---|---|---|
| 3,379,259 A | * | 4/1968 | Metler | ................ E21B 17/1085 166/242.4 |
| 5,277,253 A | * | 1/1994 | Giroux | .................. E21B 33/128 166/187 |

(Continued)

FOREIGN PATENT DOCUMENTS

WO    WO 2013/033659 A1    3/2013

OTHER PUBLICATIONS

International Search Report and The Written Opinion of the International Search Authority, or the Declaration, dated Dec. 13, 2016, PCT/US2016/022270, 18 pages, ISA/KR.

*Primary Examiner* — Matthew R Buck
(74) *Attorney, Agent, or Firm* — Haynes and Boone, LLP

(57) ABSTRACT

A subsurface tool adapted to extend within a wellbore that includes an outer sleeve defining a first passageway; an inner sleeve disposed within the first passageway to form an annulus between the outer sleeve and inner sleeve; and a first annular diaphragm extending between the outer sleeve and the inner sleeve to fluidically isolate a first portion of the annulus from and a second portion of the annulus; wherein when the tool is in a first configuration, the first annular diaphragm is integrally formed with the inner sleeve and outer sleeve to form a single-component tool.

18 Claims, 6 Drawing Sheets

(51) Int. Cl.
*B22F 7/08* (2006.01)
*E21B 34/00* (2006.01)
*B33Y 10/00* (2015.01)

(52) U.S. Cl.
CPC ......... *B22F 2005/001* (2013.01); *B33Y 10/00* (2014.12); *E21B 2034/007* (2013.01); *Y02P 10/295* (2015.11)

(56) References Cited

U.S. PATENT DOCUMENTS

| | | | | |
|---|---|---|---|---|
| 5,364,110 | A  * | 11/1994 | Streich | E21B 33/04 |
| | | | | 166/196 |
| 9,133,689 | B2 * | 9/2015 | George | E21B 34/14 |
| 9,915,122 | B2 * | 3/2018 | Hofman | E21B 34/063 |
| 2003/0056951 | A1 * | 3/2003 | Kaszuba | E21B 34/101 |
| | | | | 166/250.01 |
| 2010/0206568 | A1 * | 8/2010 | Dowling | E21B 31/107 |
| | | | | 166/301 |
| 2011/0100643 | A1 * | 5/2011 | Themig | E21B 34/102 |
| | | | | 166/373 |
| 2013/0310961 | A1 * | 11/2013 | Intriago Velez | G06F 17/50 |
| | | | | 700/97 |
| 2015/0075809 | A1 | 3/2015 | Getzlaf et al. | |
| 2015/0308228 | A1 * | 10/2015 | Vick, Jr. | E21B 43/12 |
| | | | | 166/373 |

\* cited by examiner

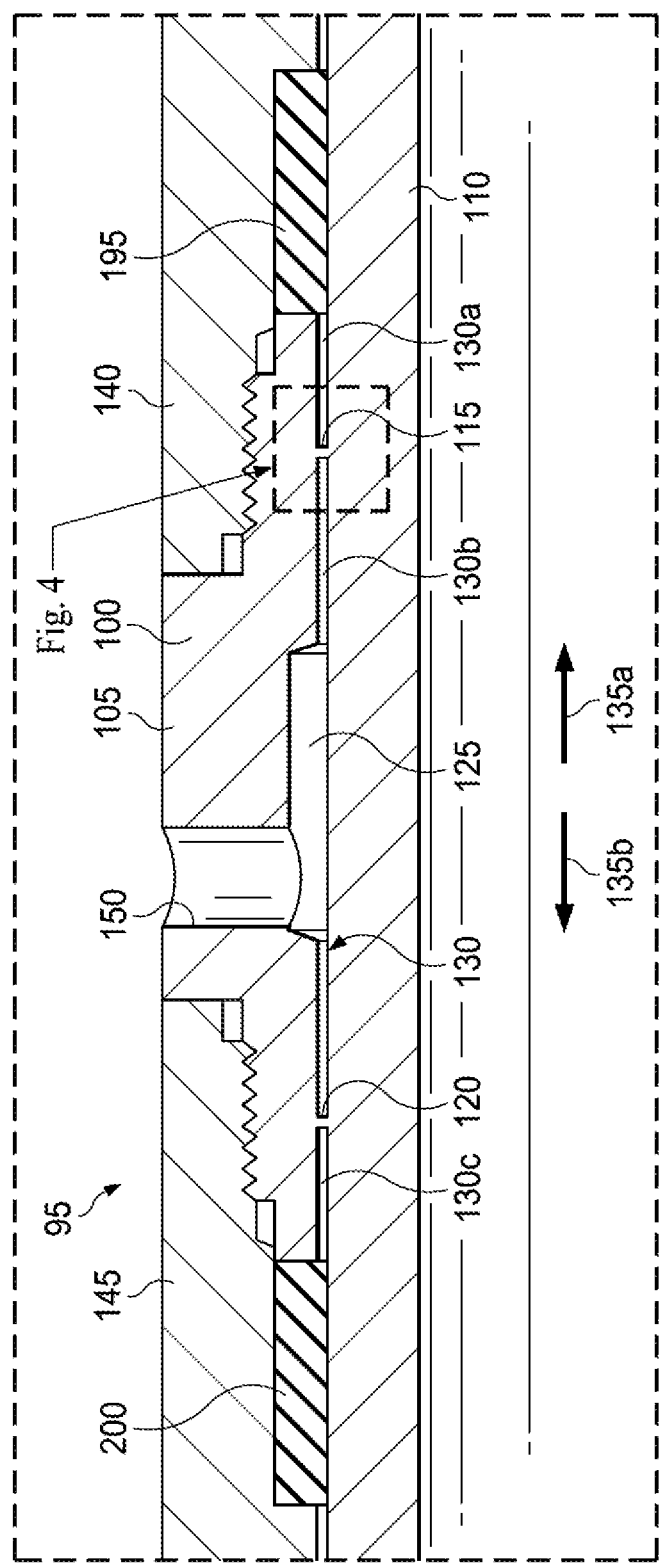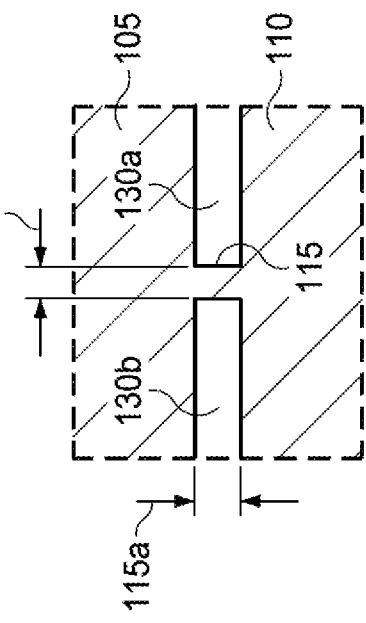

3D PRINTED SUBSURFACE TOOL HAVING A METAL DIAPHRAGM

PRIORITY

The present application is a U.S. National Stage patent application of International Patent Application No. PCT/US2016/022270, filed on Mar. 14, 2016, the benefit of which is claimed and the disclosure of which is incorporated herein by reference in its entirety.

TECHNICAL FIELD

The present disclosure relates generally to subsurface equipment that is at least partially manufactured using additive manufacturing, such as 3D printing, and more specifically, to a printed subsurface tool having a metal diaphragm.

BACKGROUND

A subsurface tool that forms a portion of a tubing string, such as a sliding door sleeve tool, often includes annular seals. The annular seals that fluidically isolate an interior passage of the tubing string from an annulus formed between the tubing string and a casing string in which the tubing string extends. The seals also hold a pressure differential between the tubing string and the annulus. When subjected to high temperatures or other conditions, the seals may degrade or the performance of the seal may be otherwise affected. When the seals are individual components of the sliding door sleeve tool and must be assembled with other components to form the sliding door sleeve, errors in the assembly may occur. Generally, it is desired to reduce the number of components in the subsurface tool.

The present disclosure is directed to printed subsurface equipment, such as a printed subsurface tool having a metal diaphragm.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 3 is an enlarged sectional view of a portion of the tool of FIG. 2, according to an exemplary embodiment of the present disclosure;

FIG. 4 is an enlarged sectional view of a portion of the tool of FIG. 3, according to an exemplary embodiment of the present disclosure;

DETAILED DESCRIPTION

Figure 1:
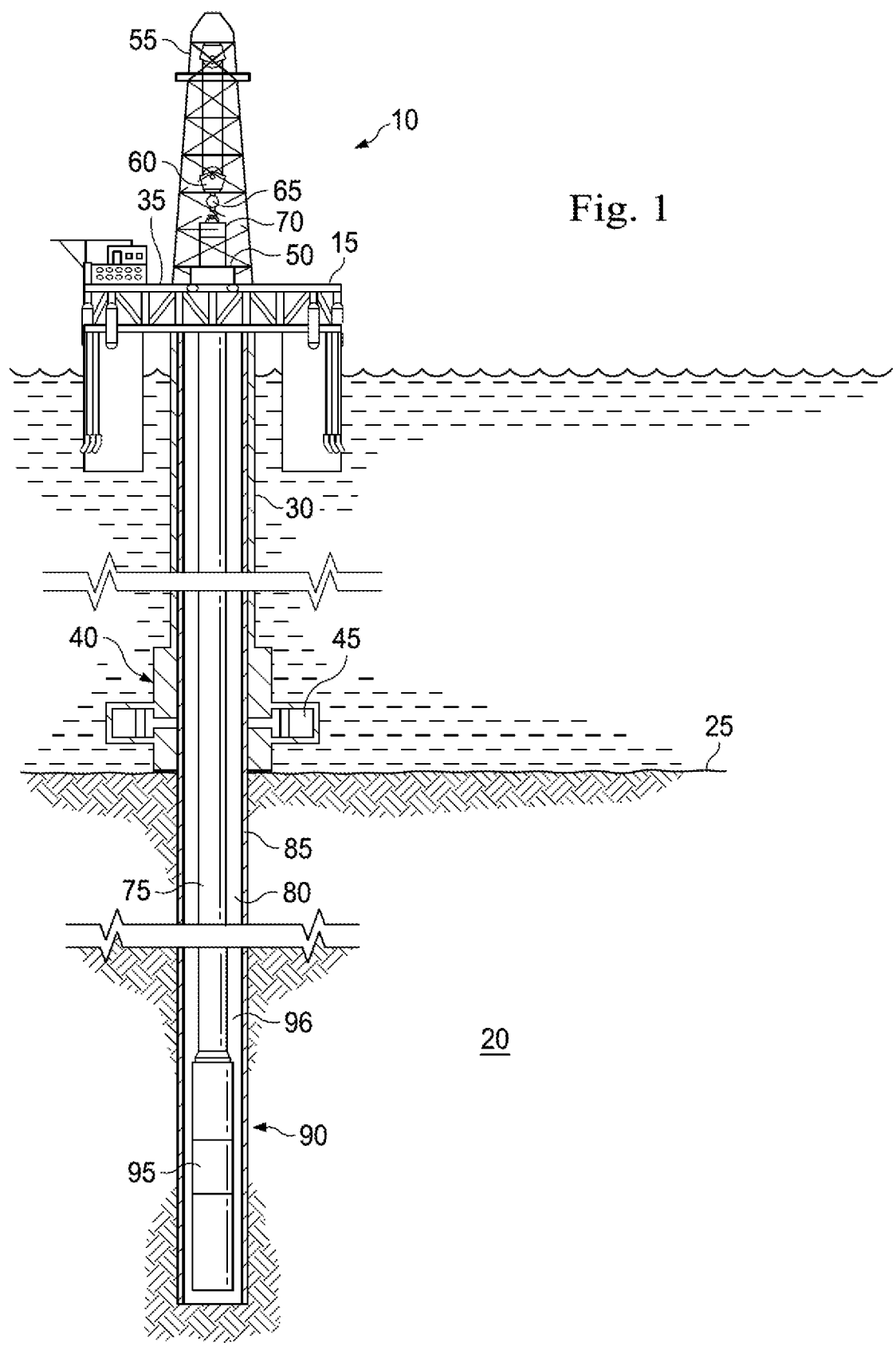
FIG. 1 is a schematic illustration of an offshore oil or gas production platform operating a printed subsurface tool having a metal diaphragm, according to an exemplary embodiment of the present disclosure.

Illustrative embodiments and related methods of the present disclosure are described below as they might be employed in a printed subsurface tool having a metal diaphragm and method of operating the same. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

FIG. 1 is a schematic illustration of an offshore oil and gas platform generally designated 10, operably coupled by way of example to a printed subsurface tool having a metal diaphragm according to the present disclosure. Such an assembly could alternatively be coupled to a semi-sub or a drill ship as well. Also, even though FIG. 1 depicts an offshore operation, it should be understood by those skilled in the art that the apparatus according to the present disclosure is equally well suited for use in onshore operations. By way of convention in the following discussion, though FIG. 1 depicts a vertical wellbore, it should be understood by those skilled in the art that the apparatus according to the present disclosure is equally well suited for use in wellbores having other orientations including horizontal wellbores, slanted wellbores, multilateral wellbores or the like.

Referring still to the offshore oil and gas platform example of FIG. 1, a semi-submersible platform 15 may be positioned over a submerged oil and gas formation 20 located below a sea floor 25. A subsea conduit 30 may extend from a deck 35 of the platform 15 to a subsea wellhead installation 40, including blowout preventers 45. The platform 15 may have a hoisting apparatus 50, a derrick 55, a travel block 60, a hook 65, and a swivel 70 for raising and lowering pipe strings, such as a substantially tubular, axially extending tubing string 75. As in the present example embodiment of FIG. 1, a wellbore 80 extends through the various earth strata including the formation 20, with a portion of the wellbore 80 having a casing string 85 cemented therein. Disposed in the wellbore 80 is a completion assembly 90. Generally, the assembly 90 may be any one or more completion assemblies, such as for example a hydraulic fracturing assembly, a gravel packing assembly, etc. The assembly 90 may be coupled to the tubing string 75 and may include a printed subsurface tool having a metal diaphragm 95 (shown in greater detail in FIGS. 2 and 3). However, the tool 95 is not limited to use with the completion assembly 90 and may be located anywhere along the tubing string 75. An annulus 96 is formed between the tubing string 75 and the casing 85.

Figure 2:
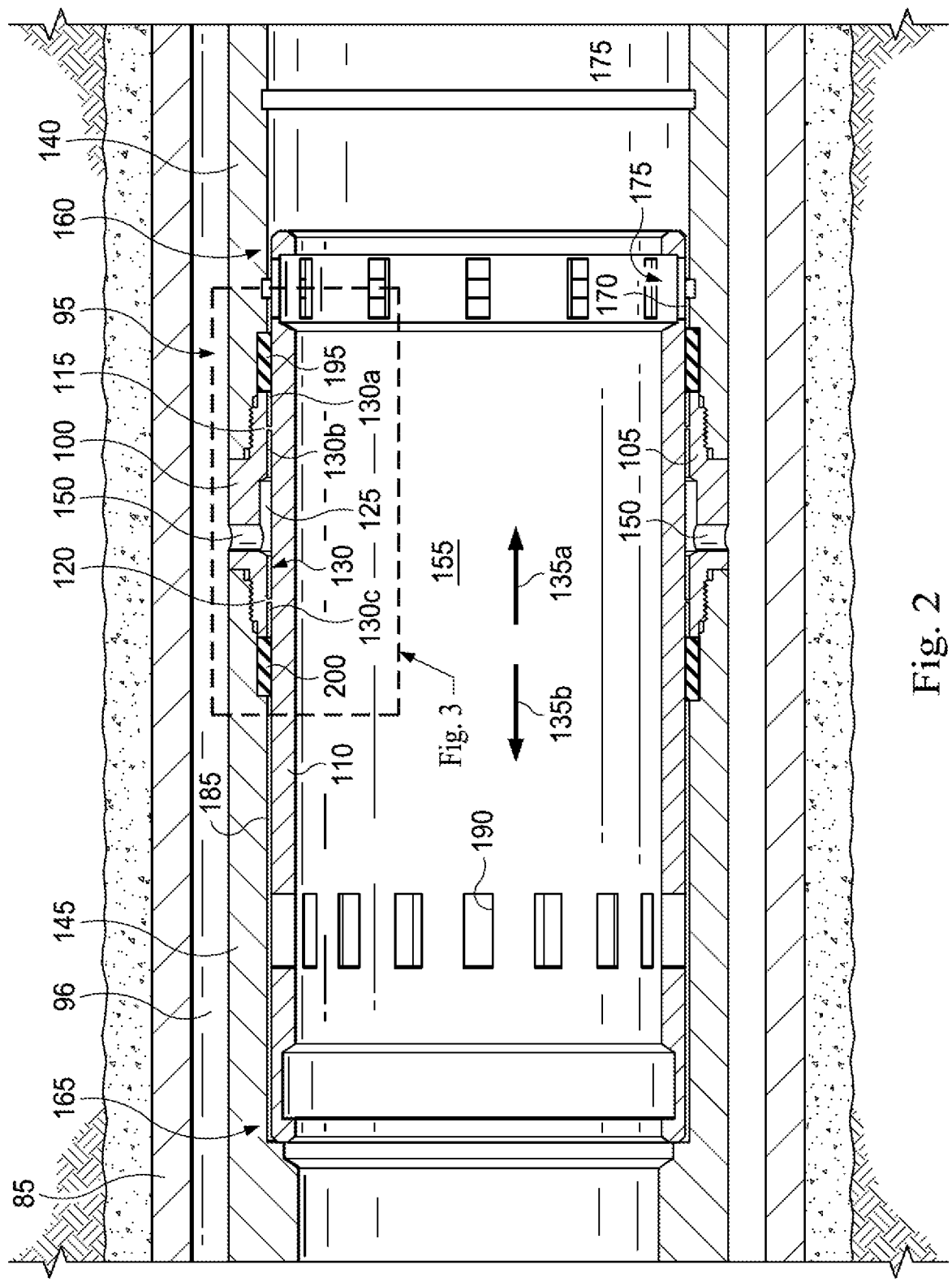
FIG. 2 is a sectional view of the tool of FIG. 1 in a first configuration, according to an exemplary embodiment of the present disclosure.

FIGS. 2 and 3 illustrate a sectional view of the tool 95, which may be a pressure equalizer or a sliding sleeve tool. The tool 95 includes an integrally formed single-component body 100 that has an outer sleeve 105, an inner sleeve 110, a first diaphragm 115, and a second diaphragm 120.

The outer sleeve 105 defines a first passageway 125 and the inner sleeve 110 extends within the first passageway 125 to form an annulus 130 between the outer sleeve 105 and inner sleeve 110. Generally, the tool 95 is disposed axially (i.e., in a direction indicated by either the numeral 135a or 135b in the FIGS. 2 and 3) between an upper mandrel 140 and a lower mandrel 145 that form a portion of the tubing string 75. As shown, a portion or portions of an external surface of the outer sleeve 105 may form external threads to couple the tool 95 to internally threaded portions of the upper mandrel 140 and the lower mandrel 145 to create a metal to metal seal. Thus, at least a portion of the tool 95 is concentrically disposed within the upper mandrel 140 and the lower mandrel 145. The outer sleeve 105 has an opening or a plurality of openings 150 that are formed therein such that a liquid can flow from the annulus 130 and through the outer sleeve 105 to an area defined in part by an external surface of the outer sleeve 105, such as for example, the annulus 96.

The inner sleeve 110 defines a second passageway 155 and has a first end portion 160 and an opposing second end portion 165. Generally, the first end portion 160 is associated with the upper mandrel 140. At least a portion of the inner sleeve 110 is concentrically disposed within the upper mandrel 140 to form an annulus 170 between the upper mandrel 140 and the inner sleeve 110. A shifting profile 175 is formed by an internal surface 180 of the inner sleeve 110 within the first end portion 140. The shifting profile 175 is configured to couple with a shifting tool (not shown). The second end portion 165 is generally associated with the lower mandrel 145. At least a portion of the inner sleeve 110 is concentrically disposed within the lower mandrel 145 to form an annulus 185 between the lower mandrel 145 and the inner sleeve 110. The inner sleeve 110 has an opening or a plurality of openings 190 that are formed therein such that the annulus 185 is in fluid communication with the interior passageway 155.

A first seal 195 and a second seal 200 sealingly engage both the inner sleeve 110 and the outer sleeve 105 to fluidically isolate the passageway 155 that is formed by the inner sleeve 110 from the first passageway 125, and specifically, a portion of the annulus 130. The first seal 195 and the second seal 200 are axially spaced such that the first seal 195 is adjacent the upper mandrel 140 and the second seal 200 is adjacent the lower mandrel 145. Additionally, the plurality of openings 150 is located axially between the first seal 195 and the second seal 200. In some embodiments, the first and second seals 195 and 200 are bi-directional seals.

The first diaphragm 115 extends between the outer sleeve 105 and the inner sleeve 110 to fluidically isolate a first portion 130a of the annulus 130 from and a second portion 130b of the annulus 130. The second diaphragm 120 also extends between the outer sleeve 105 and the inner sleeve 110 to fluidically isolate the second portion 130b of the annulus 130 from a third portion 130c of the annulus 130. Generally, the first and second diaphragms 115 and 120 are annular, but may form any shape sufficient to form a seal between the outer sleeve 105 and the inner sleeve 110. The first diaphragm 115 and the second diaphragm 120 extend circumferentially from an outer surface of the inner sleeve 110 to an inner surface of the outer sleeve 105. Thus, the first diaphragm 115 is capable of holding a pressure differential between the first portion 130a of the annulus 130 and the second portion 130b of the annulus 130 and the second diaphragm 120 is capable of holding a pressure differential between the second portion 130b of the annulus 130 and the third portion 130c of the annulus 130. FIG. 4 illustrates an enlarged portion of the body 100 of the tool 95. As shown in FIG. 4, the first diaphragm 115 has a radial dimension 115a and an axial dimension 115b. The second diaphragm 120 also has a radial dimension and an axial dimension. Generally, a shear strength or tensile strength of the tool 95 is associated with, and dependent upon, the radial and axial dimensions of the first and second diaphragms 115 and 120. Also, the designed pressure differential of the tool 95 is associated with and dependent upon the radial and axial dimension of the first and second diaphragms 115 and 120. In an exemplary embodiment, the first and second diaphragms 115 and 120 comprise a metal material. However, the first and second diaphragms 115 and 120 may comprise of any material, such as a plastic, composite, or other non-metallic material.

In a first configuration, the outer sleeve 105, the inner sleeve 110, the first diaphragm 115, and the second diaphragm 120 is integrally formed from the single component body 100. Thus, although the annulus 185 formed between the inner sleeve 110 and the lower mandrel 145 is in fluid communication with the internal passageway 155, the second portion 130b of the annulus 130 is fluidically isolated from the interior passageway 155 due to the first and second diaphragms 115 and 120 and the first and second seals 195 and 200. Similarly, although the annulus 170 formed between the inner sleeve 110 and the upper mandrel 140 is in fluid communication with the internal passageway 155, the second portion 130b of the annulus 130 is fluidically isolated from the interior passageway 155 due to the first and second diaphragms 115 and 120 and the first and second seals 195 and 200. As such, the interior passageway 155 is fluidically isolated from the annulus 96. Additionally, the first and second diaphragms 115 and 120 secure the position of the inner sleeve 110 relative to the outer sleeve 105 when the tool is in the first configuration.

Figure 5:
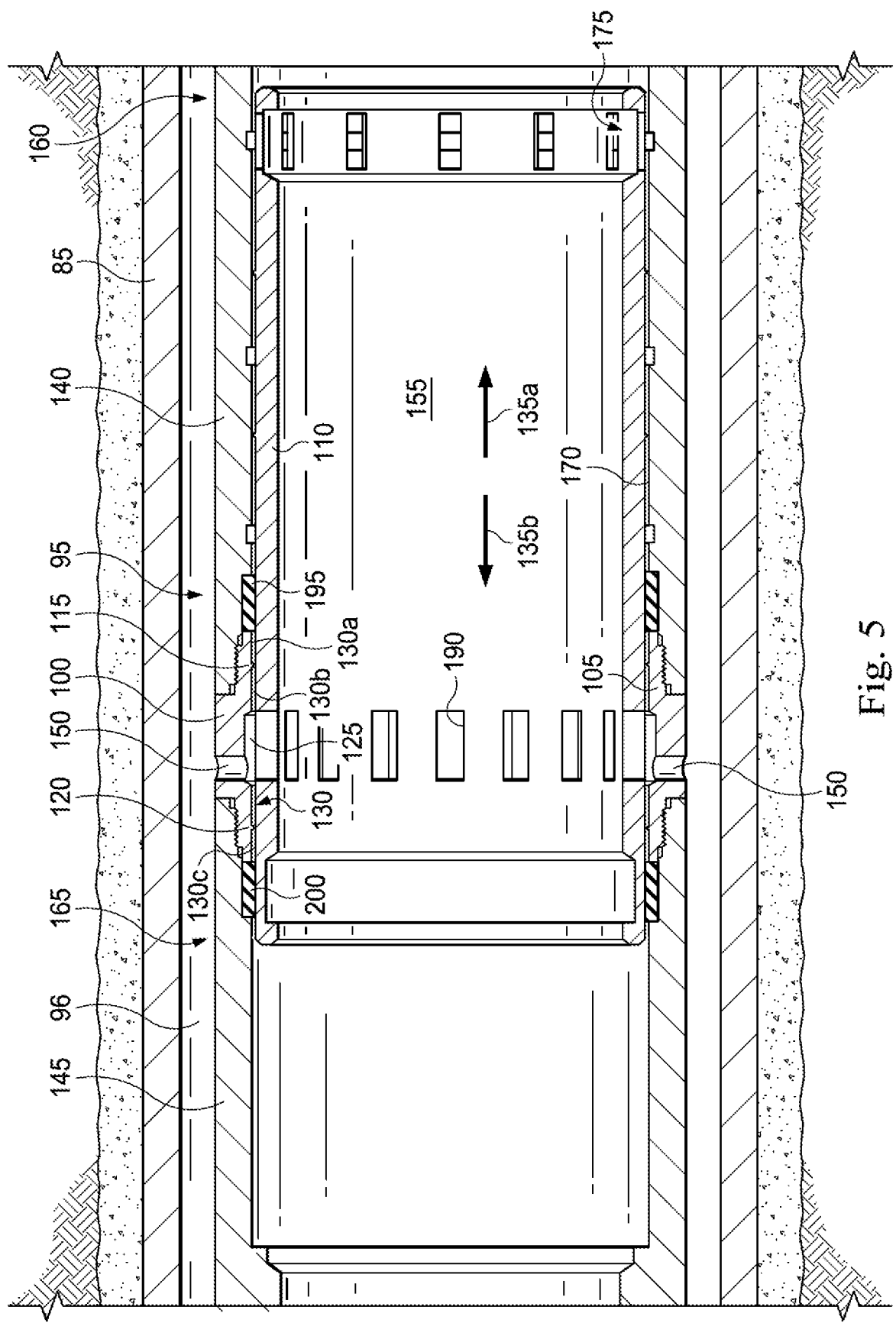
FIG. 5 is a sectional view of the tool of FIG. 2 in a second configuration, according to an exemplary embodiment of the present disclosure.

FIG. 5 is a sectional view of the tool 95 when the tool 95 is in a second configuration. When in the second configuration, the first and second diaphragms 115 and 120 are fractured (sheared or subjected to a tensile load until failure) such that the inner sleeve 110 is capable of moving relative to the outer sleeve 105. In an exemplary embodiment, the radial dimensions and the axial dimensions of the first and second diaphragms 115 and 120 are a function of the strength of the first and second diaphragms 115 and 120. That is, the required force to fracture the first and second diaphragms 115 and 120 is dependent upon the axial dimensions and the radial dimensions. The load to shear the first and second diaphragms 115 and 120 may be hydraulically or mechanically applied to the tool 95. Moreover, although the first and second diaphragms 115 and 120 are integrally formed with the inner sleeve 110 and the outer sleeve 105 when the tool 95 is in the first configuration, the first and second diaphragms 115 and 120 may comprise a different material than the material forming the inner sleeve 110 and/or the outer sleeve 105. In the second configuration, and when the inner sleeve 110 is moved in the direction 135a by a shifting tool (not shown) that couples to the tool 95 via the shifting profile 175, the plurality of openings 190 is axially aligned between the first and second seals 195 and 200 and adjacent the plurality of openings 150 and thus the annulus 96. Thus, the interior passageway 155 is in fluid communication with the plurality of openings 150 and any pressure differential between the interior passage 155 and the annulus 96 is reduced or eliminated. When the tool 95 is a sliding sleeve door tool, the sliding door is considered to be in an "open" configuration when the tool 95 is in the second configuration and allows for pressure equalization or at least a reduction of pressure differential, between the interior passageway 155 and the second section 130b of the annulus 130 and thus the annulus 96.

Figure 6:
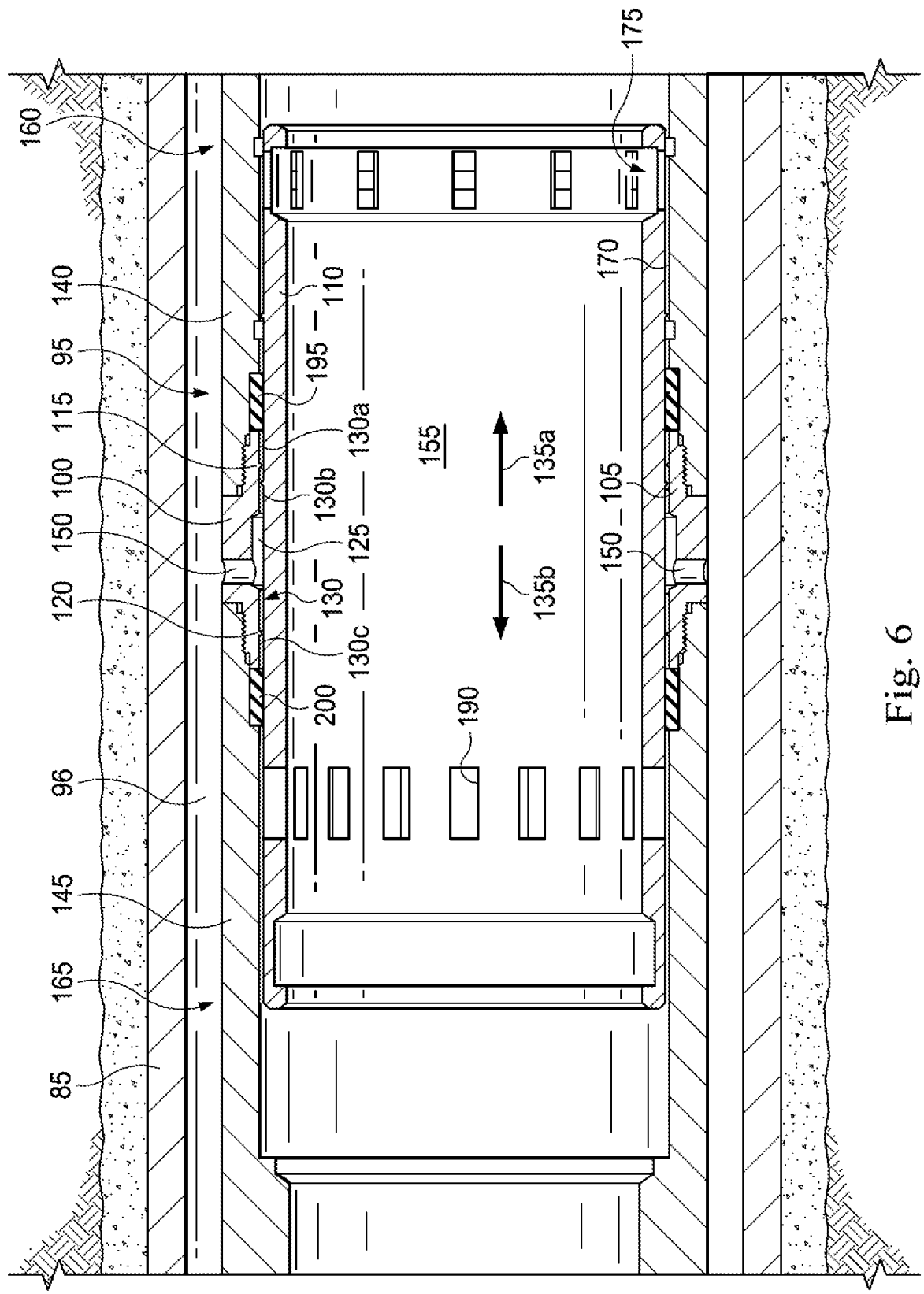
FIG. 6 is a sectional view of the tool of FIG. 2 in a third configuration, according to an exemplary embodiment of the present disclosure.

FIG. 6 is a sectional view of the tool 95 in a third configuration. When in the third configuration, the inner sleeve 110 is moved in the direction 135b such that the plurality of openings 180 is axially spaced from the second seal 200 in the direction 135b. As such, the first and second seals 195 and 200 sealingly engage the external surface of the inner sleeve 110 and the outer sleeve 105 to fluidically isolate the passageway 155 from the annulus 130 and therefore the annulus 96. Generally, the shifting tool (not shown) will shift, or move, the inner sleeve 110 in the direction 135a to "open" the tool 95 and move the inner sleeve 115 in the direction 135b to "close" the tool 95 any number of times as the first and second seals 195 and 200 fluidically isolate the annulus 125 from the annulus 185 and the annulus 170 and therefore fluidically isolates the annulus 96 from the interior passageway 155.

Exemplary embodiments of the present disclosure may be altered in a variety of ways. For example, one or both of the first and second seals 195 and 200 may be positioned in the annulus 130. That is, the seals 195 and 200, or a portion of the seals 195 and 200, may be concentrically disposed between the outer sleeve 105 and the inner sleeve 110. In some embodiments, the inner sleeve 110, the plurality of openings 150, and the second diaphragm 120 is omitted. Instead, the first diaphragm 115 extends across the interior passageway 125 to form a solid disc to fluidically isolate one portion of the interior passageway 12 from another portion of the interior passageway. The tool 95 is not limited to a sliding sleeve door tool or a pressure equalizer, but may be any tool adapted to fluidically isolate two areas.

In an exemplary embodiment, the tool 95 acts as a pressure seal between the annulus 96 and the interior passageway 155. As the body 100 of the tool 95 is integrally formed, the number of components needed to assemble the tool 95 is reduced. This reduction of components simplifies the manufacture of the tool 95 and reduces cost associated with the manufacture of the tool 95. Moreover, the reduction of components simplifies, reduces, or eliminates assembly of the tool 95 in the field, which may reduce or eliminate assembly errors made in the field. When the first and second diaphragms 115 and 120 are comprised of a metal, the tool 95 may be used in a variety of environments in which an elastomer and/or thermoplastic would normally quickly degrade. For example, in high temperature environments, first and second diaphragms 115 and 120 comprised of a metal material may be used in place of elastomer and/or thermoplastics. Additionally, when the first and second diaphragms 115 and 120 are comprised of a metal, the tool 95 may be capable of withstanding a pressure differential greater than a tool having plastic or non-metallic seals. In an exemplary embodiment, the radial and the axial dimensions of first and second diaphragms 115 and 120 are adjustable and can be designed to tailor a desired shear strength or tensile strength associated with the tool 95. In an exemplary embodiment, the tool 95 can have either large flow rates for sliding sleeve door operations or small flow rates for equalization across a plug. Additionally, as the tool 95 or a portion of the tool 95 is printed, complex internal geometries may be formed, such as for example, the second portion 130b of the annulus 130.

Figure 7:
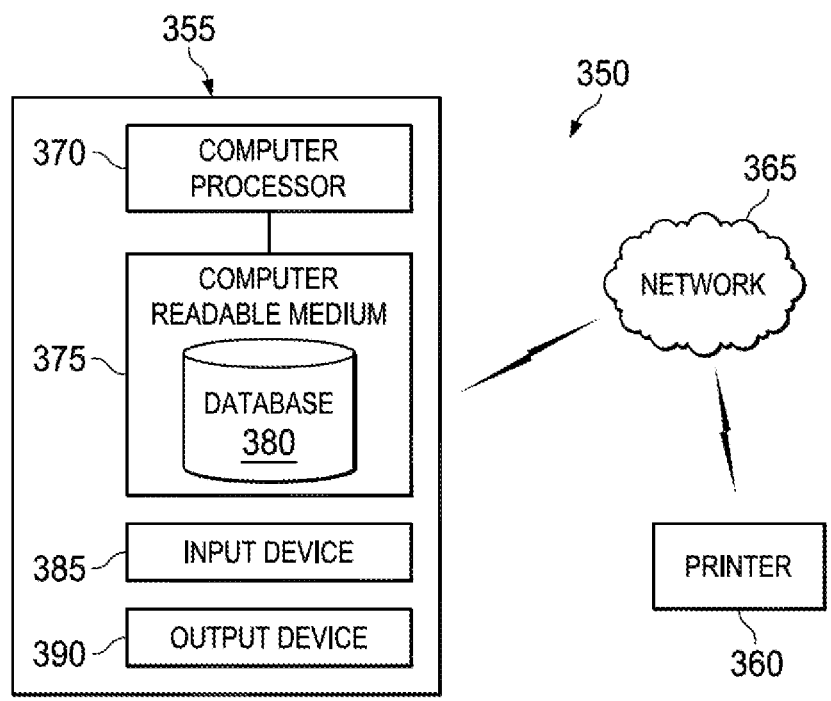
FIG. 7 illustrates an additive manufacturing system, according to an exemplary embodiment.

In an exemplary embodiment and as shown in FIG. 7, a down-hole tool printing system 350 includes one or more computers 355 and a printer 360 that are operably coupled together, and in communication via a network 365. In one or more exemplary embodiments, the tool 95 may be manufactured using the downhole tool printing system 350. In one or more exemplary embodiments, the one or more computers 355 include a computer processor 370 and a computer readable medium 375 operably coupled thereto. In one or more exemplary embodiments, the computer processor 370 includes one or more processors. Instructions accessible to, and executable by, the computer processor 370 are stored on the computer readable medium 375. A database 380 is also stored in the computer readable medium 375. In one or more exemplary embodiments, the computer 355 also includes an input device 385 and an output device 390. In one or more exemplary embodiments, web browser software is stored in the computer readable medium 375. In one or more exemplary embodiments, three dimensional modeling software is stored in the computer readable medium. In one or more exemplary embodiments, software that includes advanced numerical methods for topology optimization, which assists in determining optimum radial dimension 115a and 120a, optimum axial dimensions 115b and 120b, or other topological features in the tool 95, is stored in the computer readable medium. In one or more exemplary embodiments, software involving finite element analysis and topology optimization is stored in the computer readable medium 375. In one or more exemplary embodiments, the input device 385 is a keyboard, mouse, or other device coupled to the computer 355 that sends instructions to the computer 355. In one or more exemplary embodiments, the input device 385 and the output device 390 include a graphical display, which, in several exemplary embodiments, is in the form of, or includes, one or more digital displays, one or more liquid crystal displays, one or more cathode ray tube monitors, and/or any combination thereof. In one or more exemplary embodiments, the output device 390 includes a graphical display, a printer, a plotter, and/or any combination thereof. In one or more exemplary embodiments, the input device 385 is the output device 390, and the output device 390 is the input device 385. In several exemplary embodiments, the computer 355 is a thin client. In several exemplary embodiments, the computer 355 is a thick client. In several exemplary embodiments, the computer 355 functions as both a thin client and a thick client. In several exemplary embodiments, the computer 355 is, or includes, a telephone, a personal computer, a personal digital assistant, a cellular telephone, other types of telecommunications devices, other types of computing devices, and/or any combination thereof. In one or more exemplary embodiments, the computer 355 is capable of running or executing an application. In one or more exemplary embodiments, the application is an application server, which in several exemplary embodiments includes and/or executes one or more web-based programs, Intranet-based programs, and/or any combination thereof. In one or more exemplary embodiments, the application includes a computer program including a plurality of instructions, data, and/or any combination thereof. In one or more exemplary embodiments, the application written in, for example, HyperText Markup Language (HTML), Cascading Style Sheets (CSS), JavaScript, Extensible Markup Language (XML), asynchronous JavaScript and XML (Ajax), and/or any combination thereof.

In one or more exemplary embodiments, the printer 360 is a three-dimensional printer. In one or more exemplary embodiments, the printer 360 includes a layer deposition mechanism for depositing material in successive adjacent layers; and a bonding mechanism for selectively bonding one or more materials deposited in each layer. In one or more exemplary embodiments, the printer 360 is arranged to form a unitary printed body by depositing and selectively bonding a plurality of layers of material one on top of the other. In one or more exemplary embodiments, the printer 360 is arranged to deposit and selectively bond two or more different materials in each layer, and wherein the bonding mechanism includes a first device for bonding a first material in each layer and a second device, different from the first device, for bonding a second material in each layer. In one or more exemplary embodiments, the first device is an ink jet printer for selectively applying a solvent, activator or adhesive onto a deposited layer of material. In one or more exemplary embodiments, the second device is a laser for selectively sintering material in a deposited layer of material. In one or more exemplary embodiments, the layer deposition means includes a device for selectively depositing at least the first and second materials in each layer. In one or more exemplary embodiments, any one of the two or more different materials may be ABS plastic, PLA, polyamide, glass filled polyamide, sterolithography materials, silver, titanium, steel, wax, photopolymers, polycarbonate, and a variety of other materials. In one or more exemplary embodiments, the printer 360 may involve fused deposition modeling, selective laser sintering, and/or multi-jet modeling. In operation, the computer processor 370 executes a plurality of instructions stored on the computer readable medium 375. As a result, the computer 355 communicates with the printer 360, causing the printer 360 to manufacture the tool 95 or at least a portion thereof. In one or more exemplary embodiments, manufacturing the tool 95 using the system 350 results in an integrally formed body 100.

Figure 8:
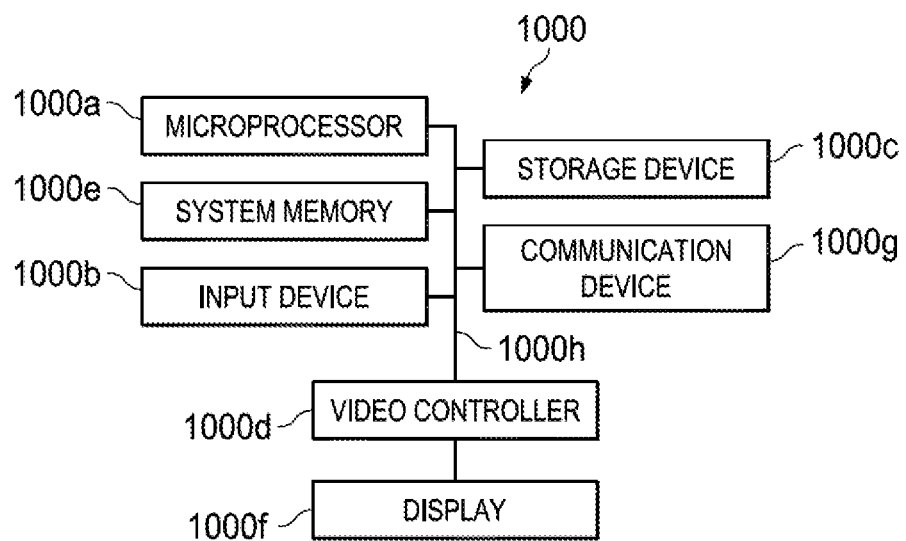
FIG. 8 is a diagrammatic illustration of a node for implementing one or more exemplary embodiments of the present disclosure, according to an exemplary embodiment.

In one or more exemplary embodiments, as illustrated in FIG. 8 with continuing reference to FIGS. 1-7, an illustrative computing device 1000 for implementing one or more embodiments of one or more of the above-described networks, elements, methods and/or steps, and/or any combination thereof, is depicted. The computing device 1000 includes a processor 1000a, an input device 1000b, a storage device 1000c, a video controller 1000d, a system memory 1000e, a display 1000f, and a communication device 1000g, all of which are interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer readable medium that may contain executable instructions. In one or more exemplary embodiments, the computer readable medium is a non-transitory tangible media. In several exemplary embodiments, the communication device 1000g may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, the one or more computers 355, the printer 360, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, one or more computers 355, and the printer 360 and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In one or more exemplary embodiments, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In one or more exemplary embodiments, a data structure may provide an organization of data, or an organization of executable code.

In several exemplary embodiments, the network 365, and/or one or more portions thereof, may be designed to work on any specific architecture. In one or more exemplary embodiments, one or more portions of the network 365 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In one or more exemplary embodiments, the data contained in the location of a character file can be mapped to a field in a second table. In several exemplary embodiments, the physical location of the database is not limiting, and the database may be distributed. In one or more exemplary embodiments, the database may exist remotely from the server, and run on a separate platform. In one or more exemplary embodiments, the database may be accessible across the Internet. In several exemplary embodiments, more than one database may be implemented.

In several exemplary embodiments, a computer program, such as a plurality of instructions stored on a computer readable medium, such as the computer readable medium 375, the system memory 1000e, and/or any combination thereof, may be executed by a processor to cause the processor to carry out or implement in whole or in part the operation of the system 350, and/or any combination thereof. In several exemplary embodiments, such a processor may include one or more of the computer processor 370, the processor 1000a, and/or any combination thereof. In several exemplary embodiments, such a processor may execute the plurality of instructions in connection with a virtual computer system.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 1000a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

In one or more exemplary embodiments, the instructions may be generated, using in part, advanced numerical method for topology optimization to determine optimum dimensions of the tool 95.

During operation of the system 350, the computer processor 370 executes the plurality of instructions that causes the manufacture of the tool 95 or a portion of the tool 95 using additive manufacturing. Thus, the tool 95 is at least partially manufactured using an additive manufacturing process. Manufacturing the tool 95 via machining forged billet stock or using multi-axis milling processes often limits the geometries and design of the tool 95. Thus, with additive manufacturing, complex geometries—such as the first and second diaphragms 115 and 120—are achieved or allowed, which results in the creation of complex internal geometries within the tool 95. In one or more exemplary embodiments, the use of three-dimensional, or additive, manufacturing to manufacture downhole equipment, such as the tool 95, will allow increased flexibility in the strategic placement of material to retain strength in one direction but reduce strength, or weaken the tool in another direction.

Thus, a subsurface tool adapted to extend within a wellbore has been described. Embodiments of the tool may generally include an outer sleeve defining a first passageway; an inner sleeve disposed within the first passageway to form an annulus between the outer sleeve and inner sleeve; and a first annular diaphragm extending between the outer sleeve and the inner sleeve to fluidically isolate a first portion of the annulus from and a second portion of the annulus; wherein when the tool is in a first configuration, the first annular diaphragm is integrally formed with the inner sleeve and outer sleeve. Additionally, an apparatus has been described. Embodiments of the apparatus may generally include a non-transitory computer readable medium; and a plurality of instructions stored on the non-transitory computer readable medium and executable by one or more processors, the plurality of instructions including instructions that cause the manufacture of a subsurface tool adapted to extend within a wellbore, the tool includes an outer sleeve defining a first passageway; an inner sleeve disposed within the first passageway to form an annulus between the outer sleeve and inner sleeve; and a first annular diaphragm extending between the outer sleeve and the inner sleeve to fluidically isolate a first portion of the annulus from and a second portion of the annulus; wherein when the tool is in a first configuration, the first annular diaphragm is integrally formed with the inner sleeve and outer sleeve. Any of the foregoing embodiments may include any one of the following elements, alone or in combination with each other:

When the tool is in a second configuration, the first diaphragm is fractured so that the first portion of the annulus is in fluid communication with the second portion of the annulus.

The tool includes a second annular diaphragm extending between the outer sleeve to fluidically isolate the second portion of the annulus from a third portion of the annulus; wherein when the tool is in the first configuration, the second annular diaphragm is integrally formed with the inner sleeve and outer sleeve.

When the tool is in a second configuration, the first and the second diaphragm is ruptured to place the second portion of the annulus in fluid communication with the first and third portions of the annulus.

The first annular diaphragm has an axial dimension and a radial dimension; and a shear strength associated with the tool is a function of the axial dimension and the radial dimension of the first annular diaphragm The outer sleeve has an opening formed therein, the opening being in fluid communication with the second portion of the annulus.

The tool also includes first and second seals, each of the first and second seals engaging both the inner sleeve and the outer sleeve to fluidically isolate a second passageway that is formed by the inner sleeve from the first passageway; wherein the first seal and the second seal are axially spaced such that the opening is located axially between the first and second seals.

The inner sleeve is comprised of a first material and the first diaphragm is comprised of a second material that is different than the first material.

The tool is a sliding sleeve or an equalizing tool and the first diaphragm is comprised of a metal.

The tool is at least partially manufactured using an additive manufacturing process.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims. The foregoing description and figures are not drawn to scale, but rather are illustrated to describe various embodiments of the present disclosure in simplistic form.

What is claimed is:

1. A subsurface tool adapted to extend within a wellbore, the tool comprising:
   an outer sleeve defining a first passageway;
   an inner sleeve disposed within the first passageway to form an annulus between the outer sleeve and the inner sleeve; and
   a first annular diaphragm extending between the outer sleeve and the inner sleeve to fluidically isolate a first portion of the annulus from a second portion of the annulus;
   wherein when the tool is in a first configuration, the first annular diaphragm is integrally formed with the inner sleeve and the outer sleeve to form a single component;
   wherein when the tool is in a second configuration, the first diaphragm is fractured so that the first portion of the annulus is in fluid communication with the second portion of the annulus.

2. The tool of claim 1, further comprising a second annular diaphragm extending between the inner sleeve and the outer sleeve to fluidically isolate the second portion of the annulus from a third portion of the annulus; wherein when the tool is in the first configuration, the second annular diaphragm is integrally formed with the inner sleeve and the outer sleeve.

3. The tool of claim 2, wherein when the tool is in the second configuration, each of the first and the second diaphragms is ruptured to place the second portion of the annulus in fluid communication with the first and third portions of the annulus.

4. The tool of claim 1,
   wherein the first annular diaphragm has an axial dimension and a radial dimension; and
   wherein a shear strength associated with the tool is a function of the axial dimension and the radial dimension of the first annular diaphragm.

5. The tool of claim 1, wherein the outer sleeve has an opening formed therein, the opening being in fluid communication with the second portion of the annulus.

6. The tool of claim 5, the tool further comprising first and second seals, each of the first and second seals engaging both the inner sleeve and the outer sleeve to fluidically isolate a second passageway that is formed by the inner sleeve from the first passageway; wherein the first seal and the second seal are axially spaced such that the opening is located axially between the first and second seals.

7. The tool of claim 1, wherein the tool is a sliding sleeve or an equalizing tool and the first diaphragm is comprised of a metal.

8. The tool of claim 1, wherein the first annular diaphragm is integrally formed with the inner sleeve and the outer sleeve using an additive manufacturing process.

9. The tool of claim 8, wherein the inner sleeve is comprised of a first material and the first diaphragm is comprised of a second material that is different than the first material.

10. An apparatus comprising:
    a non-transitory computer readable medium; and
    a plurality of instructions stored on the non-transitory computer readable medium and executable by one or more processors, the plurality of instructions comprising:
    instructions that cause the manufacture of a subsurface tool adapted to extend within a wellbore, the tool comprising:
    an outer sleeve defining a first passageway;
    an inner sleeve disposed within the first passageway to form an annulus between the outer sleeve and the inner sleeve; and
    a first annular diaphragm extending between the outer sleeve and the inner sleeve to fluidically isolate a first portion of the annulus from a second portion of the annulus;
    wherein when the tool is in a first configuration, the first annular diaphragm is integrally formed with the inner sleeve and the outer sleeve to form a single component;
    wherein when the tool is in a second configuration, the first diaphragm is fractured so that the first portion of the annulus is in fluid communication with the second portion of the annulus.

11. The apparatus of claim 10, wherein the tool further comprises a second annular diaphragm extending between the inner sleeve and the outer sleeve to fluidically isolate the second portion of the annulus from a third portion of the annulus; wherein when the tool is in the first configuration, the second annular diaphragm is integrally formed with the inner sleeve and the outer sleeve.

12. The apparatus of claim 11, wherein when the tool is in the second configuration, each of the first and the second diaphragms is ruptured to place the second portion of the annulus in fluid communication with the first and third portions of the annulus.

13. The apparatus of claim 10,
wherein the first annular diaphragm has an axial dimension and wherein a shear strength associated with the tool is a function of the axial dimension of the first annular diaphragm; and
wherein the first annular diaphragm has a radial dimension and wherein the shear strength associated with the tool is a function of the radial dimension of the first annular diaphragm.

14. The apparatus of claim 10, wherein the outer sleeve has an opening formed therein, the opening being in fluid communication with the second portion of the annulus.

15. The apparatus of claim 14, wherein the tool further comprises first and second seals, each of the first and second seals engaging both the inner sleeve and the outer sleeve to fluidically isolate a second passageway that is formed by the inner sleeve from the first passageway; wherein the first seal and the second seal are axially spaced such that the opening is located axially between the first and second seals.

16. The apparatus of claim 10, wherein the tool is a sliding sleeve or an equalizing tool and the first diaphragm is comprised of a metal.

17. The apparatus of claim 10, wherein the first annular diaphragm is integrally formed with the inner sleeve and the outer sleeve using an additive manufacturing process.

18. The apparatus of claim 17, wherein the inner sleeve is comprised of a first material and the first diaphragm is comprised of a second material that is different than the first material.

* * * * *